US010114834B2

(12) United States Patent
Yin et al.

(10) Patent No.: US 10,114,834 B2
(45) Date of Patent: *Oct. 30, 2018

(54) EXOGENOUS VIRTUAL MACHINE SYNCHRONIZATION AND REPLICATION

(71) Applicant: CA, Inc., New York, NY (US)

(72) Inventors: Jinxing Yin, Beijing (CN); Pengcheng Dun, Beijing (CN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,617

(22) Filed: Dec. 12, 2016

(65) Prior Publication Data

US 2017/0091221 A1 Mar. 30, 2017

Related U.S. Application Data

(63) Continuation of application No. 14/538,485, filed on Nov. 11, 2014, now Pat. No. 9,519,656, which is a
(Continued)

(51) Int. Cl.
*G06F 9/46* (2006.01)
*G06F 9/455* (2018.01)
(Continued)

(52) U.S. Cl.
CPC .... *G06F 17/30179* (2013.01); *G06F 9/45558* (2013.01); *G06F 11/2069* (2013.01);
(Continued)

(58) Field of Classification Search
None
See application file for complete search history.

(56) References Cited

U.S. PATENT DOCUMENTS 7,165,158 B1 1/2007 Yagawa
7,478,211 B2 1/2009 Shackelford
(Continued)

OTHER PUBLICATIONS

"CA ARCserve Replication and High Availability Deployment Options for Microsoft Hyper-V", copyright 2010 CA, 4 pages.
(Continued)

*Primary Examiner* — Bing Zhao
(74) *Attorney, Agent, or Firm* — Pillsbury Winthrop Shaw Pittman LLP

(57) ABSTRACT

The system and method described herein may provide a virtualized replication and high availability environment. In particular, a virtualized production server may run one or more virtual machines in one or more child partitions and have a replication and high availability engine installed in a parent partition. The replication and high availability engine may automatically discover the virtual machines running in the child partitions and automatically synchronize all files associated with the virtual machines to a virtualized replica server. Furthermore, the replication and high availability engine may continuously replicate subsequent changes to the files associated with the virtual machines running in the child partitions to the virtualized replica server, which may then create on-demand virtual machines from the synchronized and replicated files to handle switchover, failover, switchback, and failback events associated with the virtualized production server or the virtual machines running in the child partitions associated therewith.

31 Claims, 4 Drawing Sheets

Related U.S. Application Data continuation of application No. 13/349,709, filed on Jan. 13, 2012, now Pat. No. 8,893,147.

(51) Int. Cl.
  *G06F 13/00* (2006.01)
  *G06F 21/00* (2013.01)
  *G06F 11/00* (2006.01)
  *G06F 17/30* (2006.01)
  *G06F 11/20* (2006.01)

(52) U.S. Cl.
  CPC ............... *G06F 17/30233* (2013.01); *G06F 2009/45562* (2013.01)

(56) References Cited

U.S. PATENT DOCUMENTS

| | | | |
|---|---|---|---|
| 7,533,229 | B1 | 5/2009 | Van Rietschote |
| 7,730,031 | B2 | 5/2010 | Forster |
| 7,788,524 | B2 | 8/2010 | Wing |
| 7,840,535 | B2 | 11/2010 | Barboi et al. |
| 7,840,963 | B2 | 11/2010 | Traut |
| 7,877,639 | B2 | 1/2011 | Hosang |
| 8,301,597 | B1 | 10/2012 | Zhou et al. |
| 8,495,019 | B2 | 7/2013 | Shisheng et al. |
| 8,495,316 | B2 | 7/2013 | Nagarkar |
| 8,930,315 | B2 | 1/2015 | Chandhok |
| 2008/0126834 | A1 | 5/2008 | Sankaran |
| 2008/0155169 | A1 | 6/2008 | Hiltgen |
| 2008/0189700 | A1 | 8/2008 | Schmidt |
| 2010/0070725 | A1 | 3/2010 | Prahlad |
| 2010/0162039 | A1 | 6/2010 | Goroff |
| 2010/0250718 | A1 | 9/2010 | Igarashi |
| 2010/0250785 | A1 | 9/2010 | Shin |
| 2010/0262586 | A1 | 10/2010 | Rosikiewicz |
| 2010/0325474 | A1 | 12/2010 | Gopinath |
| 2010/0325485 | A1 | 12/2010 | Kamath |
| 2011/0072293 | A1 | 3/2011 | Mazzaferri |

OTHER PUBLICATIONS

Chappell, David, "Virtualization for Windows: A Technology Overview", Aug. 2008, Microsoft Corporation, 28 pages.

"Hyper-V Live Migration over Distance; Reference Architecture Guide" by Hitachi Data Systems in collaboration with Microsoft, Brocade and Ciena, Jun. 2010, Hitachi Data Systems, 26 pages.

"Protecting Hyper-V Environments", copyright 2011 CA, 35 pages.

"Getting to Know Hyper-V: A Walkthrough from Initial Setup to Common Scenarios", Windows Server 2008 R2, Published Dec. 2009, Updated Feb. 2010, Microsoft Corporation, 37 pages.

Cully et al; Remus: High Availability via Asynchronous Virtual Machine Replication; USDI '08; 2008.

Zhu et al; Optimizing the Performance of Virtual Machine Synchronization for Fault Tolerance; IEEE Nov. 4, 2010.

HP; HP Data Protector Software Guide to virtual server protection, HP; Sep. 29, 2010.

EXOGENOUS VIRTUAL MACHINE SYNCHRONIZATION AND REPLICATION

This application is a continuation of U.S. patent application Ser. No. 14/538,485, filed Nov. 11, 2014, now U.S. Pat. No. 9,519,656, which is a continuation of U.S. patent application Ser. No. 13/349,709, filed Jan. 13, 2012, now U.S. Pat. No. 8,893,147, each of the foregoing applications is incorporated herein in its entirety by reference.

FIELD

The invention generally relates to a system and method for providing a virtualized replication and high availability environment, and in particular, to installing a replication and high availability engine in a parent partition on a virtualized production server (rather than virtual machines that run in child partitions on the virtualized production server), automatically discovering the virtual machines running in the child partitions on the virtualized production server, and automatically synchronizing all files associated with the virtual machines and continuously replicating subsequent changes to the files associated with the virtual machines to a virtualized replica server that can create on-demand virtual machines from the synchronized and replicated files to handle switchover, failover, switchback, and failback events associated with the virtualized production server or the virtual machines running therein.

BACKGROUND

Today, many (if not all) organizations tend to conduct substantial amounts of business electronically, and consequently, depend on having reliable, continuous access to information technology systems, applications, and resources in order to effectively manage business endeavors. At the same time, information technology threats ranging from viruses, malware, and data corruption to application failures and natural disasters are growing in number, type, and severity, while current trends in technology have presented information technology departments with a plethora of recurring challenges. For example, the need to do business at an increasingly faster pace with larger critical data volumes have amplified the pressure on information technology, which has led to efforts to consolidate, migrate, or virtualize servers and resources hosted thereon without disrupting operations or damaging resources. As such, even isolated failures have the potential to render information technology resources unavailable, which may cause organizations to lose substantial amounts of revenue or information that could impede or even cripple business. Although certain organizations have attempted to utilize backup solutions to protect the information that applications create, many backup solutions lack the restoration granularity required to quickly restore important data, while others demand full restoration to temporary disk space (even to recover one single file).

Consequently, many organizations have turned to complementary replication and high availability solutions to minimize downtime and protect critical applications and data, and moreover, efforts to implement server virtualization with Microsoft Hyper-V and other virtualization platforms have increased due to the potential that virtualization has to increase information technology flexibility, drive down costs, and accelerate time to market. Although mainstream virtualization adoption has the potential to enable simple, economical, and reliable disaster recovery strategies, many adopters tend to quickly discover that virtualization adds new complexity that can interfere with achieving data protection, system availability, and disaster recovery goals (e.g., because protecting virtual servers raises additional and/or different issues from protecting physical servers). In other words, even with all the potential benefits that virtualization can potentially offer, increasing diversity in virtualized computing environments introduces abstraction that requires a coordinated and cohesive management approach to realize the visibility, control, and automation essential to planning and deploying an organized, secure, and scalable virtualized infrastructure. For example, to the extent that some virtualization vendors provide data protection capabilities, these solutions typically only work on the particular platforms that the virtualization vendors deliver. As such, protecting applications and related data associated with virtual machines hosted on virtualized servers, whether implementing VMware, Microsoft Hyper-V, Citrix XenServer, or other virtualization technology, requires more than backup and restore solutions alone can provide because point solutions are not cost-effective and add complexity to managing a heterogeneous environment.

Accordingly, because disruptions to system and application availability and data loss typically translates to lost revenue, lower customer service and employee productivity, and even damage to reputation, organizations need more than point or platform-specific backup and restore solutions to achieve faster recovery times with continuous data protection, high availability to support demanding service level agreements and disaster recovery strategies, and business protection in modern fast-paced environments. Although virtualization has the potential to streamline information technology infrastructure and resource efficiency, reduce capital and operating costs, and improve business continuity, the risk that virtual deployments will proceed unmanaged and unsecured tends to increase with increased virtualization and abstraction. In particular, rather than achieving a consolidated and secure infrastructure, an uncontrolled virtual machine proliferation termed "virtual sprawl" may result instead. For example, without automated monitoring, alerting, and control, virtualization may create lag times in responding to business needs, provisioning resources, and implementing effective security measures. Furthermore, capacity planning and automation must be implemented to mitigate information technology inefficiencies, slow response times, and missed business opportunities. In a related sense, virtualization tends to cross multiple silos, which requires coordinated management and integration and time-consuming manual processes that can hinder performance and elevate costs.

In the replication, high availability, and data protection context, virtualized systems usually require installing appropriate engines on virtual machines managed therein in order to protect applications that may be running in the managed virtual machines. However, manually installing the engines on the virtual machines tends to be difficult, time consuming, and resource intensive. For example, usage information associated with a particular virtual machine may require the engine installed thereon to create several different high availability scenarios, including some that may be unnecessary or not relevant to user needs. Moreover, manually installing engines on individual virtual machines requires users to know how to configure different applications running therein (e.g., SQL, Exchange, SharePoint, etc.), which tends to introduce substantial human resource and information technology resource costs. Because each virtualization platform contains specific management tools, organizations tend to quickly feel the pain associated with multiple management solutions, uncoordinated manual processes, weak security measures, and inadequate tracking and reporting practices. As such, without a coordinated management approach, organizations may be unable to attain the promise associated with virtualization technology, which may instead become a burden that threatens to consume information technology resources, budgets, and reputations because information technology has become saddled with trying to effectively manage and scale resources while business users become frustrated because applications and services needed to dynamically respond to market opportunities may be unavailable or disrupted.

SUMMARY

According to one aspect of the invention, the system and method described herein may provide a virtualized replication and high availability environment. In particular, the system and method described herein may provide Windows, Linux, and Unix systems with high availability and continuous or periodic data protection associated with related applications and data to maximize uptime and availability associated with physical and virtualized environments. For example, the system and method described herein may provide simple mechanisms to migrate or replicate data between different servers and locations, whether physical or virtual, and to consolidate data between remote offices and a backup or archive facility and protect onsite and offsite data. Further, the system and method described herein may include non-disruptive recovery testing and data rewind capabilities to restore systems, applications, and data to prior states, which may be useful to speeding recovery times and minimizing data loss. Additionally, the system and method described herein may further include real-time server and application monitoring, automated and push-button failover or switchover, and automated and push-button switchback (or failback) to restore replica systems or replica applications in response to a production (or master) server having been repaired or replaced. In one implementation, the system and method described herein may perform monitoring at server, application, and hypervisor and virtual machine levels, which may enable the system and method to respond to issues at physical, application, and virtualization levels, and may further replicate operating systems, system states, and application data to an offline replica server, which may enable the system and method to improve protection speeds, reduce costs, and safely test and migrate from a physical to a virtual server or from one virtual server to another virtual server. Moreover, the system and method described herein may include a unified management console across all operating systems, virtualization platforms, and applications to easily visualize and manage the virtualized replication and high availability environment.

According to one aspect of the invention, the system and method described herein may provide the virtualized replication and high availability environment using an architecture having a hypervisor that runs a guest operating system directly on underlying hardware and supports isolated partitions. For example, in one implementation, the architecture may be based on Microsoft Hyper-V server virtualization technology, which may be used to create and run separate virtual machines on one physical machine and thereby consolidate multiple server and application roles and better leverage server hardware investments. Furthermore, the architecture may natively support x64 computing, which may be leveraged to efficiently run multiple different operating systems in parallel on one physical server and assign multiple processors or cores to one virtual machine to utilize the increased processing capacity associated with multi-core processors or multi-processor architectures.

According to one aspect of the invention, the hypervisor may have a parent partition that runs a virtualization stack having direct access to the underlying hardware, wherein the parent partition may create child partitions that can host any suitable guest operating system. The virtualization stack may include various components that run in a kernel mode or privileged processor ring, including a VMBus that provides a logical channel to redirect requests and responses between virtual devices in the child partitions and the parent partition to manage inter-partition communication between the parent and child partitions. The virtualization stack may further include various device drivers associated with virtual machines running in the child partitions, a kernel to support the guest operating system instance running in the parent partition, and a virtualization service provider that connects to the VMBus and handles device access requests from the child partitions. The child partitions may similarly include a kernel to support the guest operating system running therein, which may be the same or different from the guest operating system running in the parent partition, a VMBus to communicate with the parent partition, and a virtualization service consumer (or virtualization service client) that transparently communicates with the virtualization service provider in the parent partition to redirect and fulfill device access requests that originate in the child partitions. Further, the virtualization stack may include various components that run in a user mode or less privileged ring, including a virtual machine interface provider that guest operating systems or applications running in the child partitions can use to communicate with the hypervisor, a virtual machine management service that can manage states associated with the virtual machines in the child partitions and control state-related tasks associated therewith, and virtual machine worker processes that the virtual machine management service creates to start corresponding virtual machine instances in the child partitions and handle interactions between the parent partition and the virtual machines in the child partitions.

According to one aspect of the invention, the system and method described herein may provide a physical to virtualized or a virtualized to virtualized replication and high availability environment to ensure that various applications or virtual machines running on a production (or active) server will have absolute operational continuity via a virtualized replica server. In particular, the system and method described herein may validate consistency between the applications running on the production server (or virtual machines running the applications on the production server) and various virtual machine files hosted on the replica server that correspond to the applications or the virtual machines on the production server, which may enable recovering the applications (or the virtual machines) on the production server from the replica server. For example, the applications (or virtual machines) on the production server may become unavailable due to downtime, failure, or other loss or disruption associated with the production server, in which case the applications (or virtual machines) may be activated on the replica server to ensure continuity and thereby handle the downtime, failure, or disruption associated with the production server. In one implementation, the procedure that relates to loading the applications (or virtual machines) on the replica server may be considered switchover if the downtime was planned or failover if the downtime was unplanned, while the procedure to subsequently recover the applications (or virtual machines) on the production server via the replica server may be considered switchback or failback.

According to one aspect of the invention, the system and method described herein may use a replication and high availability engine on the production server and a similar replication and high availability engine on the replica server, which may both use asynchronous real-time replication and proactive validation to test whether the virtual machine files hosted on the replica server can reliably recover the applications (or virtual machines running the applications) on the production server to provide cost-effective disaster recovery. In particular, data associated with various applications and files, databases, or other suitable data sources relating thereto may be synchronized and replicated between the production server and the replica server over local, wide, or other suitable networks having the replication and high availability engine installed therein and the appropriate network connections needed to communicate with one another. As such, the virtualized replication and high availability environment may provide data synchronization, asynchronous real-time data replication, and automated switchover, failover, and switchback to provide data continuity in various deployment scenarios, which may include full system protection (physical or virtual) using a hypervisor host and replication and high availability in physical to virtual guest, virtual guest to virtual guest, and hypervisor host to hypervisor host environments.

According to one aspect of the invention, the system and method described herein may use the hypervisor host to provide the physical and virtual full system protection deployment scenarios, wherein either full system protection deployment scenario may provide application-independent synchronization to transfer a complete state associated with the production server to the virtualized replica server and subsequently replicate changes to the state associated with production server to the virtualized replica server. For example, in the physical full protection deployment scenario, a physical production server may read data directly from volumes associated with various master applications running thereon to obtain any suitable files and data relating to the operating system, system state, and disk layout associated with the master applications. In one implementation, the data may then be serialized and sent to the replica server, which may inject the serialized data into virtual hard disk files that represent the volumes associated with the master applications. For example, the replica server may include the hypervisor host within a virtualization stack having a substantially similar architecture to that described above, whereby the hypervisor host may run various different operating systems in one or more child partitions to support the operating systems that run the master applications on the physical production server. As such, to synchronize the complete state associated with the physical production server, the replica server may use the hypervisor host to inject the serialized data into the virtual hard disk files and thereby perform volume-level synchronization associated with the master applications. The virtualized full system protection scenario may operate in a substantially similar manner to the physical full system protection deployment scenario, except that the virtualized full system protection scenario may include a virtualized production server having a hypervisor host that can read the volume data associated with the master applications directly from virtual hard disk files associated with virtual machines that run the applications on the virtualized production server.

According to one aspect of the invention, in either the physical full system protection deployment scenario or the virtual full system protection deployment scenario, any subsequent changes to the applications or the virtual machines that run the applications may then be replicated within the virtual hard disk files that correspond to the applications or virtual machines, wherein to handle switchover or failover in response to disruption associated with a master application or virtual machine, the disrupted master application or virtual machine may be disabled and the virtualized replica server may create an on-demand virtual machine from the virtual machine files corresponding thereto and make the on-demand virtual machine available to ensure continuity (e.g., the hypervisor host may configure the on-demand virtual machine with various values specified in a virtual machine configuration file, connect the on-demand virtual machine to a disk image mounted from the virtual hard disk file, and boot the on-demand virtual machine to make the on-demand virtual machine available to end users without disruption). Accordingly, because the physical and virtual full system protection deployment scenarios can protect the entire state associated with the production server, the full system protection deployment scenarios may support large sets of applications and environments and may be simple to deploy because automatically transferring the entire state associated with the production server to the virtualized replica server may obviate or substantially reduce a need to manually provision or otherwise synchronize the virtualized replica server prior to initiating replication operations.

According to one aspect of the invention, to provide the physical to virtual guest replication and high availability deployment scenario, the system and method described herein may have various master applications and a replication and high availability engine running on a physical production server. In one implementation, the virtualized replica server may have a similar replication and high availability engine in addition to a virtualization stack to manage various virtual machine files that correspond to the master applications running on the physical production server. As such, the replication and high availability engine running on the physical production server may generally replicate data associated with the master applications or any other suitable data residing on the physical production server to the virtualized replica server, which may reside at the same location as the physical production server or at a remote data center to provide a data protection and disaster recovery site. In one implementation, the physical to virtual guest replication and high availability deployment scenario may generally include synchronizing the physical production server and the virtualized replica server (e.g., via the full system protection techniques described above or any other suitable technique) and then continuously capturing and replicating byte-level changes to the data residing on the physical production server to the virtualized replica server. As such, the virtualization stack on the virtualized replica server may include an active hypervisor that has access to underlying hardware and runs a guest operating system to replicate the changes within various virtual machine files that correspond to the master applications and other data volumes residing on the physical production server and thereby deliver continuous onsite or offsite data protection. Moreover, in one implementation, the changes captured and replicated from the physical production server to the virtualized replica server may be recorded in a rewind log to preserve a context associated with the replicated data (e.g., to track the changes, undo the changes at the production server, locate a switch point in the virtual machine files on the replica server that can be used to suitably resume business operations in response to disaster or other failure associated with the production server, etc.).

According to one aspect of the invention, in the physical to virtual guest replication and high availability deployment scenario, the system and method described herein may therefore synchronize and replicate the physical production server to the virtualized replica server to support automated or manual switchover and failover to redirect workloads from the physical production server to the virtualized replica server. For example, the virtualized replica server may invoke one or more components in the virtualization stack to automatically start one or more on-demand virtual machines in response to disruption associated with the physical production server or one or more applications running thereon, wherein the virtualization stack may start the on-demand virtual machines from the virtual machine files that correspond to the applications experiencing disruption on the physical production server. As such, end users and workloads associated with the disrupted applications may then be automatically redirected to the on-demand virtual machines on the virtualized replica server to handle the switchover or failover and thereby minimize business downtime. Alternatively, the procedure to start the on-demand virtual machines on the virtualized replica server and redirect the end users and workloads to the virtualized replica server may be initiated manually, which may enable information technology personnel to investigate the issues that caused the disruption prior to performing the switchover or failover (if necessary).

According to one aspect of the invention, to provide the virtual guest to virtual guest replication and high availability deployment scenario, the system and method described herein may generally synchronize and replicate the production server to the virtualized replica server in a substantially similar manner to the physical to virtual guest scenario, and may further handle switchover and failover in a substantially similar manner to the physical to virtual guest scenario. However, in the virtual guest to virtual guest scenario, the production server may be virtualized, whereby the virtualized production server may run the applications within one or more virtual machines, while the virtualized replica server may run one or more corresponding virtual machines and maintain one or more virtual machine files that correspond to the virtual machines executing the applications on the virtualized production server (e.g., mirroring the virtual hard disk files, configuration files, and snapshot files associated with the virtual machines running on the virtualized production server). Further, the virtual guest to virtual guest scenario may have different replication and high availability engine instances installed and configured on the individual virtual machines running thereon, and different replication and high availability engine instances may be similarly installed and configured on the individual virtual machines running on the virtualized replica server. Accordingly, the replication and high availability engine instances on the virtualized production server and the virtualized replica server may communicate with one another to synchronize, replicate, and manage switchover and failover associated with the individual virtual machines running the applications on the virtualized production server.

According to one aspect of the invention, the system and method described herein may provide the hypervisor host to hypervisor host replication and high availability deployment scenario to obviate or substantially reduce a need to install and configure different instances associated with the replication and high availability engine on individual virtual machines, which may advantageously provide hypervisor-level replication, switchover and failover, and rewind and recovery capabilities associated with all (or certain selected) virtual machines running on the virtualized production server (e.g., if a third party provides the replication and high availability engine, the hypervisor-level replication and high availability scenario may limit the need to purchase the license to only one per virtual host). Moreover, the hypervisor-level replication and high availability scenario may substantially reduce deployment time and costs because the requisite software need only be installed on the parent partition within each virtual host and may further reduce processor and memory usage because each virtual machine would not require a local replication and high availability engine instance. In addition, because the virtualized replica server may create the on-demand virtual machines in response to switchover or failover conditions, the hypervisor-level scenario may satisfy cold site definitions and thereby reduce costs associated with licensing operating systems and licenses associated with the applications running on the virtual hosts.

According to one aspect of the invention, to provide the hypervisor-level deployment scenario, the system and method described herein may have the virtualized production server automatically discover all virtual machines running thereon and create various replication scenarios according to the virtual machines selected to be replicated to the virtualized replica server. As such, the replication and high availability engine installed on the parent partition in the virtualized production server may replicate all the files associated with the discovered (or selected) virtual machines to the virtualized replica server, which may store the replicated files within one or more virtual machine files that correspond to the discovered or selected virtual machines, and any subsequent changes to the files associated with the discovered or selected virtual machines may be continuously replicated to the corresponding virtual machine files on the virtualized replica server in a similar manner. In response to a switchover or failover condition associated with the virtualized production server, the replication and high availability engine may bring the virtualized replica server online, use the virtualization stack in the parent partition to create on-demand virtual machines from the virtual machine files corresponding to the virtual machines on the virtualized production server, and redirect end users and workloads to the replica server to maintain consistency and minimize downtime. In one implementation, switchover or failover conditions associated with individual virtual machines may be handled similarly, wherein the virtualized replica server may start an appropriate on-demand virtual machine and redirect end users and workloads to the on-demand virtual machine to minimize downtime associated with the individual virtual machines experiencing disruption.

According to one aspect of the invention, the hypervisor-level deployment scenario may include the system and method described herein initially installing the replication and high availability engine in the parent partition on the virtualized production server (rather than the individual virtual machines) and the parent partition on the virtualized replica server. In addition, one or more components associated with the virtualization stack may be installed on the guest operating system associated with every virtual machine on the virtualized production server to determine host names associated with the virtual machines, whereby all the virtual machines on the virtualized production server may then be automatically discovered and a volume shadow copy service (VSS) writer associated with the virtualization stack may collect all the files relating to the discovered virtual machines (e.g., virtual hard disk files, configuration files, and snapshot files associated with each virtual machine). The replication and high availability engine may then automatically create various replication scenarios associated with each virtual machine to define various replication properties associated with each virtual machine, wherein the replication and high availability engine may then run all scenarios associated with all virtual machines to replicate and protect all the virtual machines, or alternatively select certain virtual machines (or certain scenarios associated with a particular virtual machine) to customize the replication scenarios used to protect the virtualized production server. In response to suitably synchronizing the files associated with the virtual machines on the virtualized production server to the virtualized replica server, any subsequent changes to the virtual machines may be replicated to the virtualized replica server.

According to one aspect of the invention, the system and method described herein may handle switchover or failover conditions associated with one or more virtual machines on the virtualized production server, which may include the virtualized replica server creating and registering one or more on-demand virtual machines corresponding the virtual machines associated with the switchover or failover condition (e.g., from the corresponding virtual machine files). In particular, the switchover and failover procedure may generally exchange active and standby roles between the virtualized production server and the virtualized replica server, whereby the virtualized production server may change to a standby role in response to the switchover or failover assigning the active role to the virtualized replica server. Furthermore, in response to the switchover or failover, the relevant scenarios may further specify how to handle reverse replication operations (e.g., replicating changes to the on-demand virtual machines to protect or otherwise backup changes to the files associated therewith), whereby changes to the on-demand virtual machines may continue to be replicated in accordance with the reverse replication operations specified in the relevant scenarios. In one implementation, the switchover or failover may be triggered manually or automatically.

According to one aspect of the invention, the system and method described herein may perform switchback or failback to return the active role to the virtualized production server and the standby role to the virtualized replica server subsequent to the switchover or failover exchanging the active and standby roles between the virtualized production server and the virtualized replica server. For example, to perform the switchback or failback, the system and method described herein may determine whether to overwrite the data that existed on the virtualized production server prior to the switchover or failover with the data existing on the virtualized replica server at the time that the switchback or failback will be performed. Furthermore, in response to data loss or data corruption on the virtualized production server, the lost or corrupted data can be restored from the virtualized replica server via reverse synchronization to the virtualized production server, or the lost or corrupted data may be recovered from a certain event in the past or a prior point in time via the data rewind capabilities (e.g., via a suitable event-stamped or time-stamped checkpoint and/or bookmark that can be used to roll the virtualized production server back to the event or point in time prior to when the data was lost or corrupted).

Other objects and advantages of the invention will be apparent to those skilled in the art based on the following drawings and detailed description.

BRIEF DESCRIPTION OF THE DRAWINGS

FIG. 2A illustrates an exemplary system that may provide a physical to virtualized replication and high availability environment, while

DETAILED DESCRIPTION

According to one aspect of the invention, the system and method described herein may provide a virtualized replication and high availability environment. In particular, the system and method described herein may provide Windows, Linux, and Unix systems with high availability and continuous or periodic data protection associated with related applications and data to maximize uptime and availability associated with physical and virtualized environments. For example, the system and method described herein may provide simple mechanisms to migrate or replicate data between different servers and locations, whether physical or virtual, and to consolidate data between remote offices and a backup or archive facility and protect onsite and offsite data. Further, the system and method described herein may include non-disruptive recovery testing and data rewind capabilities to restore systems, applications, and data to prior states, which may be useful to speeding recovery times and minimizing data loss. Additionally, the system and method described herein may further include real-time server and application monitoring, automated and push-button failover or switchover, and automated and push-button switchback (or failback) to restore replica systems or replica applications in response to a production (or master) server having been repaired or replaced. In one implementation, the system and method described herein may perform monitoring at server, application, and hypervisor and virtual machine levels, which may enable the system and method to respond to issues at physical, application, and virtualization levels, and may further replicate operating systems, system states, and application data to an offline replica server, which may enable the system and method to improve protection speeds, reduce costs, and safely test and migrate from a physical to a virtual server or from one virtual server to another virtual server. Moreover, the system and method described herein may include a unified management console across all operating systems, virtualization platforms, and applications to easily visualize and manage the virtualized replication and high availability environment.

Figure 1:
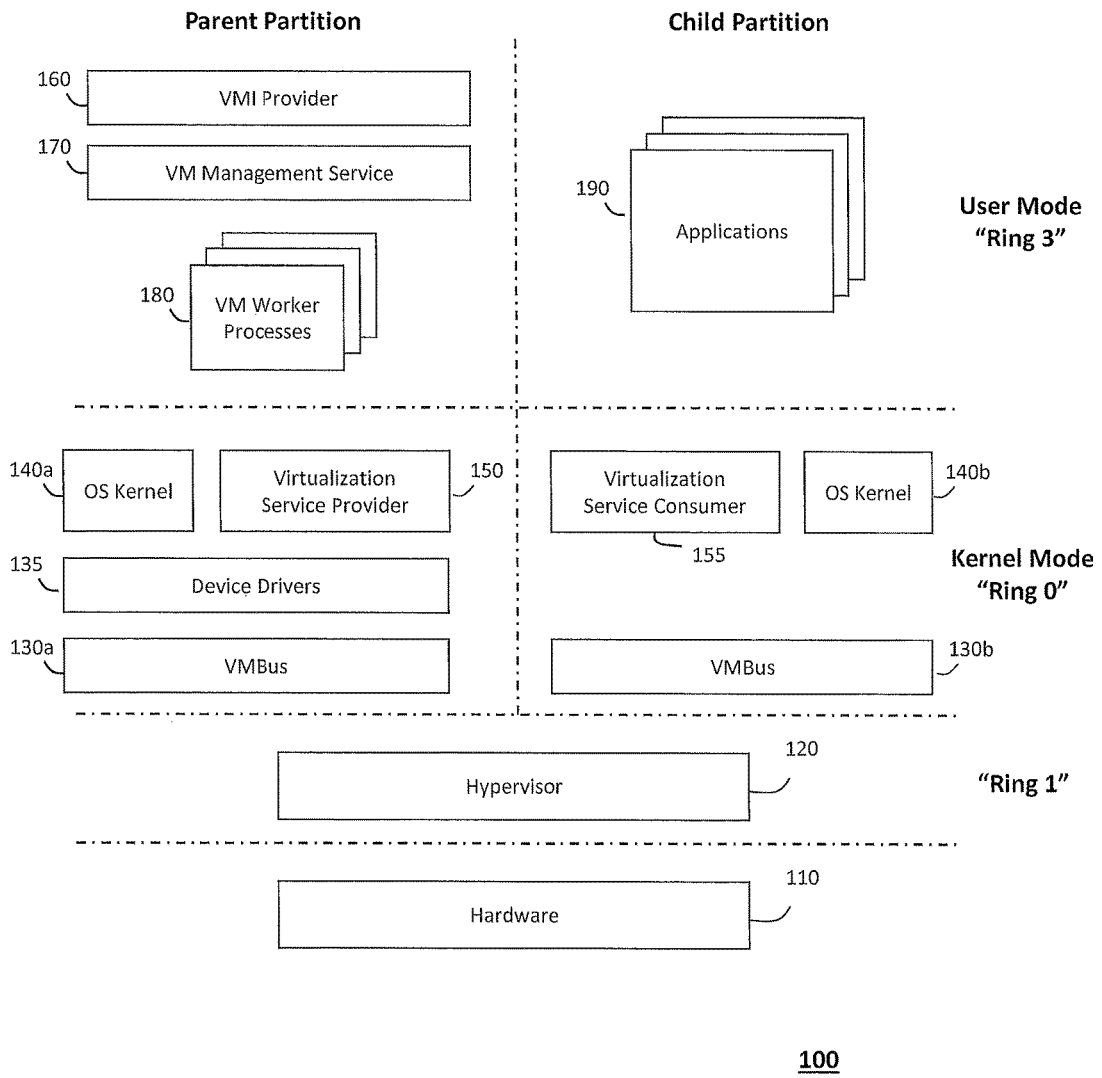
FIG. 1 illustrates an exemplary architecture that may be used to provide a virtualized replication and high availability environment, according to one aspect of the invention.

According to one aspect of the invention, FIG. 1 illustrates an exemplary architecture 100 that may be used to provide the virtualized replication and high availability environment that will be described in further detail herein. In particular, the architecture 100 illustrated in FIG. 1 may include a hypervisor 120 that runs directly on underlying hardware 110, wherein the hypervisor 120 may run a guest operating system and support isolated partitions. For example, in one implementation, the architecture 100 may include Microsoft Hyper-V server virtualization technology integrated with Windows Server 2008, which may be used to create and run separate virtual machines on one physical machine and thereby consolidate multiple server and application roles and better leverage server hardware investments. Furthermore, the Hyper-V architecture 100 may natively support x64 computing, which may be leveraged to efficiently run multiple different operating systems (e.g., Windows®, Linux, etc.) in parallel on one physical server, and may allow assigning multiple processors or processor cores to one virtual machine, which may provide a future-proof virtualization technology that can utilize the increased processing capacity associated with multi-core processors.

In one implementation, the hypervisor 120 used in the architecture 100 may have a parent partition that runs an appropriate guest operating system (e.g., Windows Server 2008 if the architecture 100 implements Microsoft Hyper-V), wherein a virtualization stack may run in the parent partition and have direct access to the underlying hardware devices 110. The parent partition may then create one or more child partitions that can host any suitable guest operating system (e.g., Windows Server 2008, Windows NT 4.0, Linux distributions, etc.). In one implementation, the virtualization stack running in the parent partition may include various components that run in a kernel mode or privileged processor ring (i.e., "Ring 0"), including a VMBus 130a that provides a logical channel to redirect requests and responses between virtual devices in the child partitions and the parent partition that has access to the underlying hardware 110 and thereby manage inter-partition communication between the parent and child partitions. In one implementation, the virtualization stack in the parent partition may further include various device drivers 135 associated with virtual machines running in the child partitions, a kernel 140a to support the guest operating system instance (e.g., Windows Server 2008) running in the parent partition, and a virtualization service provider 150 that handles device access requests from the child partitions via the VMBus 130a. For example, the child partitions may similarly include a kernel 140b to support the guest operating system running therein, which may be the same or different from the guest operating system running in the parent partition, a VMBus 130b to communicate with the parent partition, and a virtualization service consumer (or virtualization service client) 155 that transparently communicates with the virtualization service provider 150 in the parent partition (e.g., via the VMBus 130a and VMBus 130b) to redirect and fulfill device access requests that originate in the child partitions.

In one implementation, the virtualization stack in the parent partition may further include various components that run in a user mode or less privileged ring (i.e., "Ring 3"), including a virtual machine interface provider 160 that guest operating systems or applications 190 running in the child partitions can use to communicate with the hypervisor 120 (via the VMBus 130a-b). In addition, the components running in Ring 3 may include a virtual machine management service 170 that can manage states associated with the virtual machines running applications 190 in the child partitions and control tasks that relate to states associated therewith (e.g., capturing snapshots associated with the virtual machines). To that end, the virtual machine management service 170 may create one or more virtual machine worker processes 180 to start corresponding virtual machine instances that run the applications 190 in the child partitions, wherein the virtual machine worker processes 180 may handle management level interactions between the parent partition and the virtual machines in the child partitions. For example, in one implementation, the virtual machine worker processes 180 may create, configure, run, pause, resume, save, restore, and snapshot the associated virtual machine instance in the child partitions, and may further handle interrupt requests, memory, and input/output port mapping associated with the virtual machine instances. In one implementation, further detail relating to the Microsoft Hyper-V virtualization technology that may be used in the architecture 100 may be found in "Virtualization for Windows: A Technology Overview" and "Getting to Know Hyper-V: A Walkthrough from Initial Setup to Common Scenarios," the contents of which are hereby incorporated by reference in their entirety.

Figure 2A:
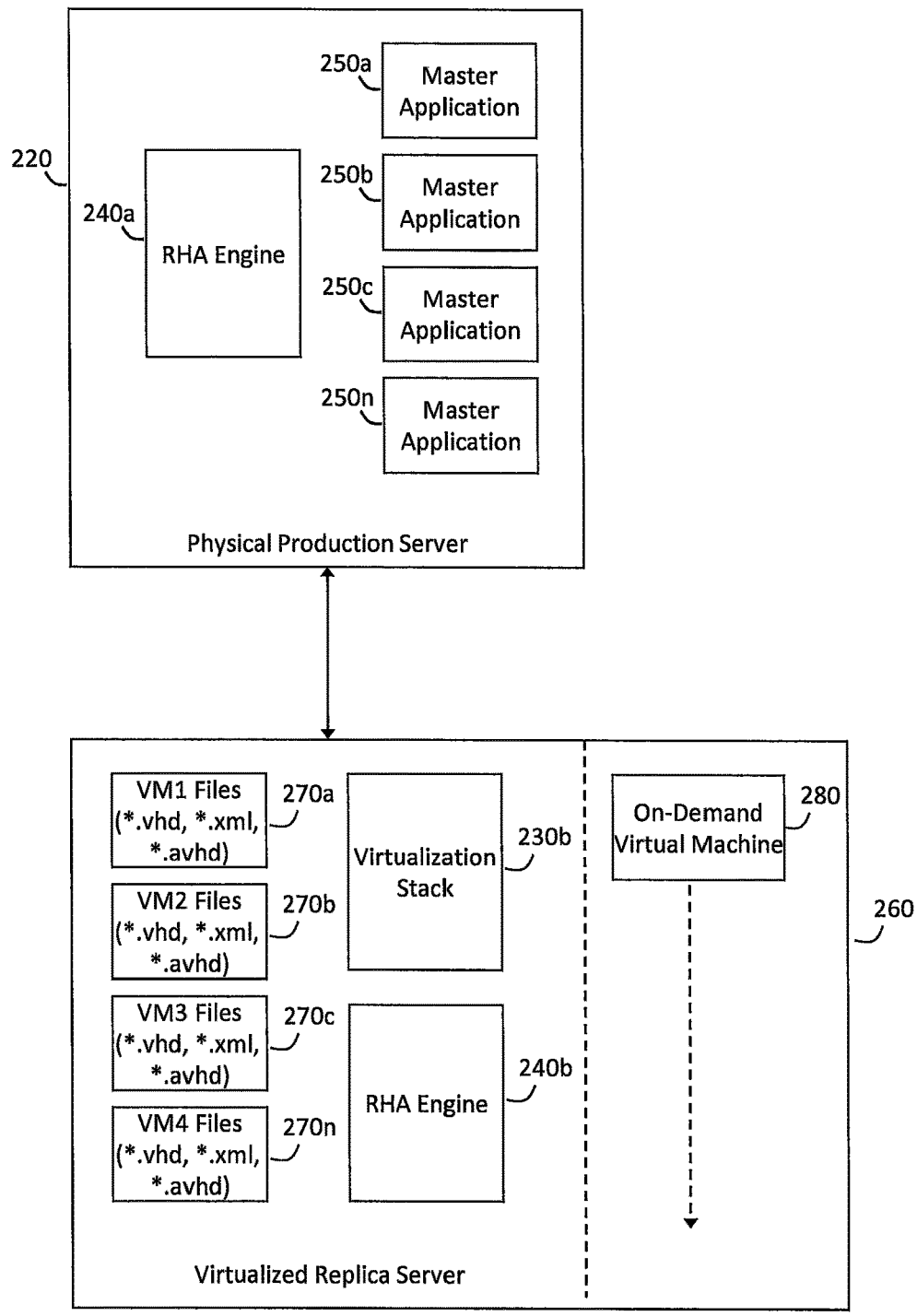
Figure 2B:
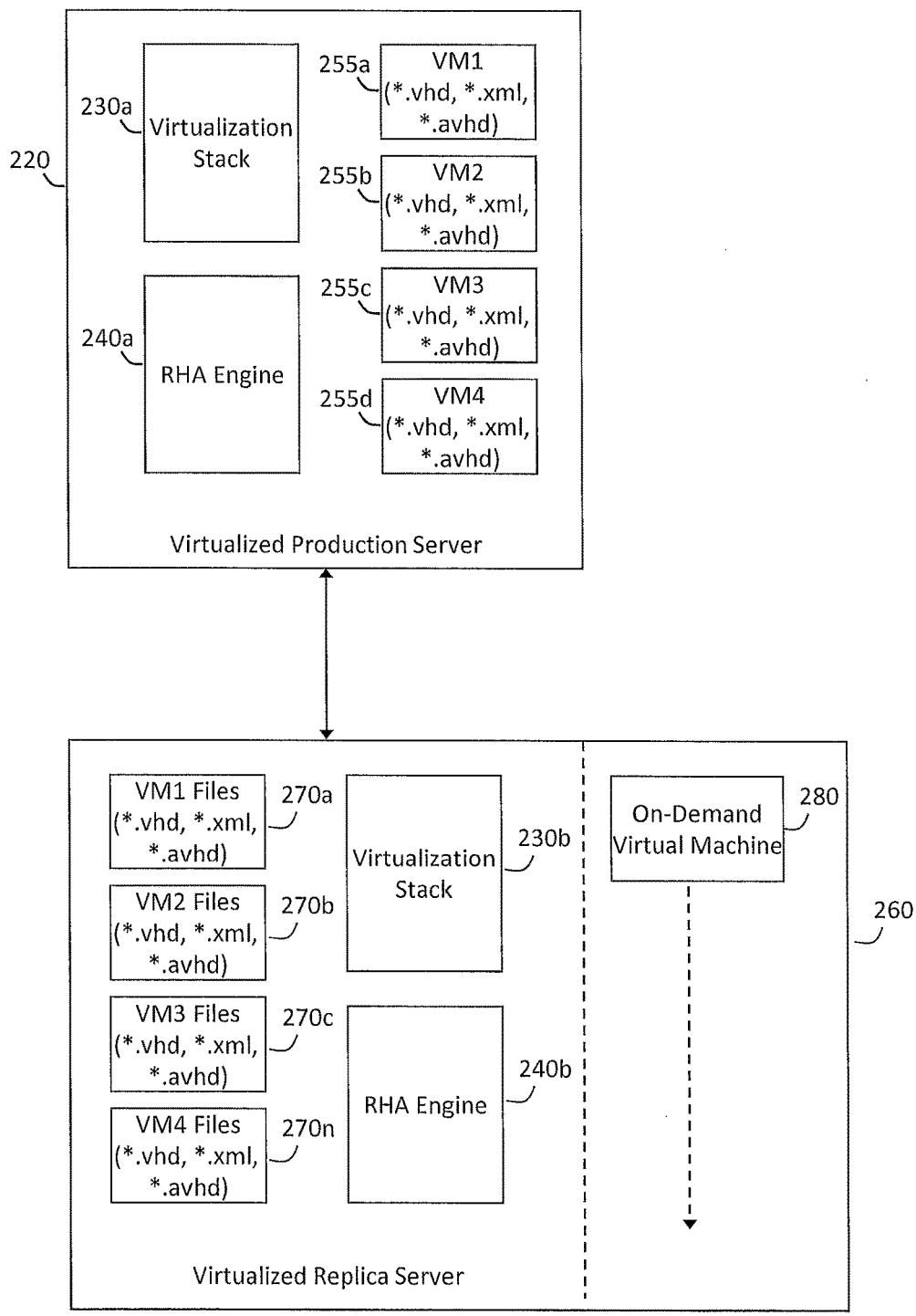
FIG. 2B illustrates an exemplary system that may provide a virtualized to virtualized replication and high availability environment, according to one aspect of the invention.

According to one aspect of the invention, FIG. 2A illustrates an exemplary system 200A that may provide a physical to virtualized replication and high availability environment, while FIG. 2B illustrates an exemplary system 200B that may provide a virtualized to virtualized replication and high availability environment. In particular, the system 200A may generally include a physical production (or active) server 220 and a virtualized replica (or standby) server 260 to ensure that various applications 250 running on the production server 220 will have absolute operational continuity to a certain degree over a given measurement period. In a similar respect, the system 200B shown in FIG. 2B may include a virtualized production server 220 having various virtual machines 255 that run the applications 250 on the production server 220, wherein the virtualized replica server 260 may similarly ensure that the applications 250 running in the virtual machines 255 on the virtualized production server 220 will have absolute operational continuity over the measurement period.

As such, to provide the virtualized replication and high availability environment, the systems 200A-B may respectively validate consistency between the applications 250 running on the physical production server 220 and the virtual machines 255 running the applications 250 on the virtualized production server and various virtual machine files 270 hosted on the replica server 260 that respectively correspond to the applications 250 and the virtual machines 255 running on the production server 220, which may enable recovering the applications 250 (or the virtual machines 255 running the applications 250) on the production server 220 from the virtual machine files 270 on the replica server 260. For example, in one implementation, the applications 250 running on the production server 220 (or the virtual machines 255 running the applications 250 on the production server 220) may become unavailable due to downtime, failure, or other loss or disruption associated with the production server 220, in which case the system 200 may load the applications 250 (or the virtual machines 255 running the applications 250 on the production server 220) on the replica server 260 to ensure continuity and thereby handle the downtime, failure, or other loss or disruption associated with the production server 220. In one implementation, the procedure in which the system 200 loads the applications 250 (or the virtual machines 255 running the applications 250) on the replica server 260 to ensure continuity may be considered switchover if the downtime was planned (e.g., to upgrade or maintain the production server 220) or failover if the downtime was unplanned (e.g., because the production server 220 failed due to a threat, overload condition, or other emergency that was not anticipated in advance). Moreover, the procedure to subsequently recover the applications 250 (or the virtual machines 255 running the applications 250) on the production server 220 from the replica server 260 may be referred to as switchback or failback.

In one implementation, the systems 200A-B shown in FIGS. 2A-B may both include a replication and high availability engine 240a on the production server 220 and a similar replication and high availability engine 240b on the replica server 260, wherein the replication and high availability engines 240a-b may use asynchronous real-time replication and proactive validation to test whether the virtual machine files 270 hosted on the replica server 260 can reliably recover the applications 250 (or the virtual machines 255 running the applications 250) on the production server 220 to provide cost-effective disaster recovery. In particular, data associated with various applications 250 and files, databases, or other suitable data sources relating thereto may be synchronized between the production server 220 and the replica server 260 and subsequent changes to the data may be asynchronously replicated between the production server 220 and the replica server 260, wherein the data may be synchronized and replicated over local area networks, wide area networks, or other suitable networks that have the replication and high availability engine 240 installed therein and the appropriate TCP or other network connections needed to communicate with one another. Thus, in one implementation, the virtualized replication and high availability environment provided in the systems 200A and 200B may provide data synchronization, asynchronous real-time data replication, and automated switchover, failover, and switchback to provide data continuity in various deployment scenarios. For example, as will be described in further detail herein, the various deployment scenarios may include full system protection (physical or virtual) using a hypervisor host, and may further include replication and high availability in physical to virtual guest, virtual guest to virtual guest, and hypervisor host to hypervisor host environments.

In one implementation, the system 200A shown in FIG. 2A may use the hypervisor host to provide the physical full system protection deployment scenario, while the system 200B shown in FIG. 2B may use the hypervisor host to provide the virtual full system protection deployment scenario, wherein either full system protection deployment scenario may provide application-independent synchronization to transfer a complete state associated with the production server 220 to the virtualized replica server 260 and subsequently replicate changes to the state associated with production server 220 to the virtualized replica server 260. For example, in the system 200A, the replication and high availability engine 240a on the physical production server 220 may read data directly from volumes associated with various master applications 250a-n running on the physical production server 220 to obtain any suitable files and data relating to the operating system, system state, and disk layout associated with the master applications 250a-n. In one implementation, the replication and high availability engine 240a may then serialize and send the data read from the volumes associated with the master applications 250a-n to the virtualized replica server 260, which may inject the serialized data into virtual hard disk (*.vhd) files 270a-n that represent the volumes associated with the master applications 250a-n. For example, in one implementation, the virtualized replica server 260 may include the hypervisor host within a virtualization stack 230b having a substantially similar architecture to that shown in FIG. 1 and described above, whereby the hypervisor host may run various different operating systems in one or more child partitions to support the operating systems that run the master applications 250 on the physical production server 220.

As such, to synchronize and transfer the complete state associated with the physical production server 220 to the virtualized replica server 260, a replication and high availability engine 240b on the virtualized replica server 260 may use the hypervisor host in the virtualization stack 230b to inject the serialized data into the *.vhd files 270 and thereby perform volume-level synchronization associated with the master applications 250a-n running on the physical production server 220. Furthermore, the system 200B may operate in a substantially similar manner to synchronize and transfer the complete state associated with the virtualized production server 220 to the virtualized replica server 260, except that the virtualized production server 220 may include a virtualization stack 230a having a hypervisor host that can read the operating system, system state, disk layout, and other volume data associated with the master applications 250 directly from virtual hard disk files associated with virtual machines 255 that run the applications 250 on the virtualized production server 220. In either scenario, subsequent to suitably synchronizing the complete state associated with the applications 250 running on the production server 220 (or the virtual machines 255 running the applications 250), the replication and high availability engine 240a on the production server 220 may replicate any changes to the applications 250 or the virtual machines 255 that run the applications 250 to the virtualized replica server 260, which may replicate the changes within the *.vhd files 270 that correspond to the changed applications 250 or virtual machines 255. In one implementation, the replication may be performed at the file-level, including all files on the volumes associated with the master applications 250 in addition to any files in system folders that relate to the production server 220. Moreover, the systems 200A-B may both use reverse path lookups to maintain consistent mappings between the *.vhd files 270 hosted on the virtualized replica server 260 and the volumes or file systems associated with the master applications 250 or virtual machines 255 on the production server 220 (e.g., using techniques described in U.S. patent application Ser. No. 13/234,532, entitled "System and Method for Network File System Server Replication Using Reverse Path Lookup," filed Sep. 16, 2011, the contents of which are hereby incorporated by reference in their entirety).

In one implementation, the virtualized replica server 260 may initially have an offline state to prevent network address, network name, or other network conflicts (i.e., because the virtualized replica server 260 represents an effective clone associated with the physical or virtualized production server 220). However, to handle switchover or failover in response to downtime, failure, or other loss or disruption associated with a particular master application 250 or virtual machine 255 running thereon, the disrupted master application 250 or virtual machine 255 may be disabled and the virtualized replica server 260 may create an on-demand virtual machine 280 from the virtual machine file 270 corresponding thereto. For example, in addition to the *.vhd files 270 that represent the volumes or file systems associated with the master applications 250a-n and virtual machines 255, the virtual machine files 270 on the virtualized replica server 260 may include a *.xml file that contains information to configure the operating system, disk size, network, and other aspects associated with the on-demand virtual machine 280 and a *.avhd file that contains a most recent snapshot associated with the master application 250 or virtual machine 255, which may be created, validated, and otherwise managed using techniques described in U.S. patent application Ser. No. 13/043,201, entitled "System and Method for Providing Assured Recovery and Replication," filed Mar. 8, 2011, and U.S. patent application Ser. No. 13/234,532, the contents of which are hereby incorporated by reference in their entirety. As such, to handle the switchover or failover condition, the virtualization stack 230b may use the virtual machine files 270 to create the on-demand virtual machine 280 and make the on-demand virtual machine 280 available to ensure continuity associated with the application 250 or virtual machine 255 that were disrupted on the production server 220. For example, the virtualization stack 230b may use the hypervisor host to configure the on-demand virtual machine 280 with various values specified in the *.xml configuration file 270, mount a disk image from the *.vhd file 270 and connect the on-demand virtual machine 280 to the mounted disk image, configure network connections associated with the on-demand virtual machine 280 with information specified in the *.xml configuration file 270, and then boot the on-demand virtual machine 280 and install integration services to make the on-demand virtual machine 280 available to end users.

Accordingly, because the physical or virtual full system protection deployment scenarios described above may protect the entire state associated with the production server 220, the physical or virtual full system protection deployment scenarios may support large sets of applications 250 and environments. Moreover, the full system protection deployment scenarios may be simple to deploy because transferring the entire state associated with the production server 220 to the virtualized replica server 260 in an automated manner may obviate or substantially reduce any need to manually provision the virtualized replica server 260 prior to initiating replication operations.

In one implementation, the system 200A shown in FIG. 2A may be used to provide the physical to virtual guest replication and high availability deployment scenario. In particular, the system 200A may include a physical production server 220 having various master applications 250a-n and a replication and high availability engine 240a running thereon in addition to a virtualized replica server 260 having a similar replication and high availability engine 240b and a virtualization stack 230b to manage various virtual machine files 270a-n that correspond to the master applications 250a-n running on the physical production server 220. As such, the replication and high availability engine 240a may generally replicate data associated with the master applications 250a-n residing on the physical production server 220 or any other suitable data residing on the physical production server 220 to the virtualized replica server 260, wherein the physical production server 220 and the virtualized replica server 260 may reside at the same location, or the virtualized replica server 260 may be located at a remote data center or remote office that provides a data protection and disaster recovery site associated with the physical production server 220.

In one implementation, in response to suitably synchronizing the physical production server 220 and the virtualized replica server 260 (e.g., via the full system protection techniques described above or another suitable mechanism), the physical to virtual guest replication and high availability deployment scenario may continuously capture and replicate byte-level changes to the master applications 250a-n and any databases or files on the physical production server 220 to the virtualized replica server 260. For example, in one implementation, the byte-level changes may be captured and replicated using techniques described in U.S. patent application Ser. No. 10/188,512, entitled "Method and System for Updating an Archive of a Computer File," filed Jul. 3, 2002, which issued as U.S. Pat. No. 7,730,031 on Jun. 1, 2010, the contents of which are hereby incorporated by reference in their entirety. As such, the virtualization stack 230b on the virtualized replica server 260 may include an active hypervisor that has access to underlying hardware and runs a guest operating system to replicate the changes within various virtual machine files 270a-n that correspond to the master applications 250a-n and other data volumes residing on the physical production server 220 and thereby deliver continuous onsite or offsite data protection. Moreover, in one implementation, the changes captured and replicated from the physical production server 220 to the virtualized replica server 260 may be recorded in a rewind log to preserve a context that can be used, for example, to track the changes, undo the changes at the production server 220, or locate a switch point in the virtual machine files 270 on the replica server 260 that can be used to suitably resume business operations in response to a disaster or other failure associated with the production server 220 (e.g., using techniques described in U.S. patent application Ser. No. 10/981,837, entitled "Replicated Data Validation," filed Nov. 5, 2004, which issued as U.S. Pat. No. 7,840,535 on Nov. 23, 2010, the contents of which are hereby incorporated by reference in their entirety).

Accordingly, the physical to virtual guest replication and high availability deployment scenario may therefore synchronize and replicate the physical production server 220 to the virtualized replica server 260 to support automated or manual switchover and failover to redirect workloads from the physical production server 220 to the virtualized replica server 260. For example, in one implementation, the virtualized replica server 260 may invoke one or more components in the virtualization stack 230b to automatically start one or more on-demand virtual machines 280 in response to downtime, failure, outage, or other disruption associated with the physical production server 220 or one or more applications 250 running thereon. In particular, the virtualization stack 230b may start the one or more on-demand virtual machines 280 from the virtual machine files 270 that correspond to the applications 250 experiencing disruption on the physical production server 220, wherein end users and workloads associated with the disrupted applications 250 may be automatically redirected to the on-demand virtual machines 280 started on the virtualized replica server 260 to handle the switchover or failover and thereby minimize business downtime. Alternatively, the procedure to start the on-demand virtual machines 280 on the virtualized replica server 260 and redirect the end users and workloads associated with the disrupted applications 250 to the virtualized replica server 260 may be initiated manually, whereby information technology personnel may investigate the issues that caused the disruption prior to performing the switchover or failover (if necessary).

In one implementation, the system 200B shown in FIG. 2B may be used to provide the virtual guest to virtual guest and hypervisor host to hypervisor host replication and high availability deployment scenarios. In particular, the virtual guest to virtual guest replication and high availability deployment scenario may generally synchronize and replicate the production server 220 to the virtualized replica server 260 in a substantially similar manner to the physical to virtual guest replication and high availability deployment scenario, and may further handle switchover and failover in a substantially similar manner to the physical to virtual guest scenario. However, in the virtual guest to virtual guest scenario, the production server 220 may be virtualized, whereby the virtualized production server 220 may include one or more virtual machines 255 to execute the applications 255 on the virtualized production server 220, while the virtualized replica server 260 runs one or more virtual machines 280 and maintains one or more virtual machine files 270 that correspond to the virtual machines 255 executing the applications 255 on the virtualized production server 220 (e.g., mirroring the *.vhd virtual hard disk files, the *.xml configuration files, and the *.avhd snapshot files associated with the virtual machines running on the virtualized production server). Furthermore, the virtual guest to virtual guest deployment scenario may have different instances of the replication and high availability engine 240*a* installed and configured on the individual virtual machines 255 running on the virtualized production server 220, and may similarly have different instances of the replication and high availability engine 240*b* installed and configured on the individual virtual machines 280 running on the virtualized replica server 260. Accordingly, the replication and high availability engine instances 240*a* on the virtualized production server 220 and the replication and high availability engine instances 240*b* on the virtualized replica server 260 may communicate with one another to synchronize, replicate, and manage switchover and failover associated with the individual virtual machines 255 running the applications 250 on the virtualized production server 220.

In one implementation, the hypervisor host to hypervisor host replication and high availability deployment scenario may obviate or substantially reduce a need to install and configure different instances associated with the replication and high availability engine 240 on individual virtual machines, which may advantageously provide hypervisor-level replication, switchover and failover, and rewind and recovery capabilities associated with all (or certain selected) virtual machines 255 running on the virtualized production server 220, In particular, if a third party provides the replication and high availability engine 240, the hypervisor-level replication, switchover and failover, and rewind and recovery capabilities may require only one license to purchase the replication and high availability engine 240 from the third party per virtual host (e.g., one license for the replication and high availability engine 240*a* on the virtualized production server 220 and one license for the replication and high availability engine 240*b* on the virtualized replica server 260). Moreover, the hypervisor-level capabilities may substantially reduce deployment time and costs because the requisite software need only be installed on the parent partition within the virtualized production server 220 and the virtualized replica server 260, and may further reduce processor and memory usage because each virtual machine 255 would not require a locally installed replication and high availability engine instance 240*a*. In addition, because the virtualized replica server 260 only creates the on-demand virtual machines 280 in response to a switchover or failover condition, the hypervisor-level deployment scenario may satisfy cold site definitions and thereby reduce costs associated with licensing operating systems and licenses associated with the applications 250 running in the virtual machines 255 on the virtualized production server 220.

In one implementation, to provide the hypervisor-level deployment scenario shown in FIG. 2B, the virtualized production server 220 may automatically discover all the virtual machines 255 running thereon and create various replication scenarios according to the virtual machines 255 that are selected to be replicated to the virtualized replica server 260. As such, the replication and high availability engine 240*a* installed on the parent partition in the virtualized production server 220 may then replicate all the files associated with the discovered virtual machines 255 (or the virtual machines 255 selected to be replicated) to the virtualized replica server 260, which may use the replication and high availability engine 240*b* to store the replicated files within one or more virtual machine files 270 that correspond to the discovered (or selected) virtual machines 255. In a similar respect, in response to any subsequent changes to the files associated with the discovered (or selected) virtual machines 255, the changes may be continuously replicated within the corresponding virtual machine files 270 stored on the virtualized replica server 260 (via the replication and high availability engine 240*b*). In response to any switchover (planned downtime) or failover (unplanned downtime) conditions associated with the virtualized production server 220, the replication and high availability engine 240*b* may bring the virtualized replica server 260 online, use the virtualization stack 230*b* in the parent partition to create on-demand virtual machines 280 within one or more child partitions from the virtual machine files 270 corresponding to the discovered or selected virtual machines on the virtualized production server 220, and redirect end users and workloads to the replica server 260 to maintain consistency and minimize downtime associated with the disruption to the virtualized production server 220. In one implementation, switchover or failover conditions associated with individual discovered or selected virtual machines 255 may be handled in a similar manner, whereby the virtualized replica server 260 may start an appropriate on-demand virtual machine 280 and redirect end users and workloads to the on-demand virtual machine 280 to minimize downtime associated with the individual discovered or selected virtual machines 255 experiencing disruption.

More particularly, the hypervisor-level replication and high availability scenario may include initially installing the replication and high availability engine 240*a* in the parent partition on the virtualized production server 220 (rather than the individual virtual machines 255) and similarly installing the replication and high availability engine 240*b* in the parent partition on the virtualized replica server 260. In addition, one or more components associated with the virtualization stack may be installed on the guest operating system associated with every virtual machine 255 on the virtualized production server 220 to enable the replication and high availability engine 240*a* to determine host names associated with the virtual machines 255. The replication and high availability engine 240*a* may then automatically discover all the virtual machines 255 on the virtualized production server 220 and use a volume shadow copy service (VSS) writer associated with the virtualization stack 230*a* to collect all the files 270 relating to the discovered virtual machines 255, wherein the collected files 270 may include the *.vhd files that represent virtual hard disks associated with each virtual machine 255, the *.xml configuration files that contain unique identifiers and various settings associated with each virtual machine 255, and the *.avhd files that contain all snapshots associated with the individual virtual machines 255.

In one implementation, in response to suitably collecting all the files 270 relating to the discovered virtual machines 255, the replication and high availability engine 240*a* may automatically create various replication scenarios associated with each virtual machine 255. In particular, the replication scenarios may generally define various replication properties associated with each virtual machine 255, wherein the properties may enable or disable scheduled bookmarks on the production server 220, set spool sizes and directory paths, replicate in online or scheduled modes, specify whether to synchronize at a file-level or block-level, specify whether to ignore certain files having the same size and type, specify whether to run a script, send an email, or log results to handle event notifications and reporting, and enable or disable delays or data rewind capabilities, among others. In one implementation, each replication scenario associated with an individual virtual machine 255 may include all the files 270 relating thereto, including the *.vhd, virtual hard disk file, the *.xml configuration file, and the *.avhd snapshot file associated with the individual virtual machine 255. In one implementation, the replication and high availability engine 240a may then run all the scenarios associated with all the virtual machines 255 in order to replicate and protect all the virtual machines 255. Alternatively, one or more virtual machines 255 (or certain scenarios associated with a particular virtual machine 255) may be selected to customize the replication scenarios used to protect the virtualized production server 220. In one implementation, in response to suitably synchronizing the files 270 associated with the virtual machines 255 on the virtualized production server 220 that are to be replicated to the virtualized replica server 260, the replication and high availability engine 240a may then replicate any subsequent changes to the files 270 associated with such virtual machines 255 to the virtualized replica server 260 (via the replication and high availability engine 240b installed thereon).

In one implementation, in response to a switchover or failover condition associated with one or more virtual machines 255 on the virtualized production server 220, the virtualized replica server 260 may then create and register one or more on-demand virtual machines 280 corresponding to the one or more virtual machines 255 associated with the switchover or failover condition on the virtualized production server 220, wherein the on-demand virtual machines 280 may be created from the virtual machine files 270 corresponding to the virtual machines 255 associated with the switchover or failover condition. In particular, the switchover and failover procedure may generally exchange active and standby roles between the virtualized production server 220 and the virtualized replica server 260, whereby the virtualized production server 220 may change to a standby role in response to the switchover or failover assigning the active role to the virtualized replica server 260. Furthermore, in response to performing the switchover or failover, the relevant scenarios may further specify how to handle reverse replication operations (e.g., replicating changes to the on-demand virtual machines 280 to protect or otherwise backup changes to the files 270 associated therewith), whereby the replication and high availability engine 240b on the virtualized replica engine 260 may continue to replicate changes to the on-demand virtual machines 280 in accordance with the reverse replication operations specified in the relevant scenarios once the virtualized production server 220 becomes available (e.g., changes may be resynchronized from the virtualized replica server 260 to the virtualized production server 220, which may include comparing data on the virtualized production server 220 to data on the virtualized replica server 260 to determine the changes to replicate back to the virtualized production server 220).

In one implementation, the switchover or failover may be triggered manually (e.g., due to planned downtime, to balance loads among the virtualized production server 220 and the virtualized replica server 260, in response to a notification that the virtualized production server 220 has become unavailable, etc.). Alternatively, the switchover or failover may be triggered automatically (at a scheduled time or in response to detecting that the virtualized production server 220 has become unavailable), wherein the replication and high availability engine 240b on the virtualized replica server 260 may periodically check the status associated with the virtualized production server 220 to determine whether to trigger the switchover or failover procedure. For example, in one implementation, the replication and high availability engine 240b may periodically send ping requests to the virtual machines 255 running on the virtualized production server 220 and automatically bring up the corresponding on-demand virtual machine 280 on the virtualized replica server 260 if the virtualized production server 220 does not respond. Alternatively, the virtualized replica server 260 may check the status associated with the virtualized production server 220 via custom requests to monitor specific applications 250 or virtual machines 255 or requests to databases or services running in the parent partition associated with the virtualized production server 220 to verify the status associated therewith. In another alternative, the switchover may be manually triggered to test certain applications 250 or virtual machines 255 on the virtualized replica server 260 without disrupting or otherwise interfering with operations on the virtualized production server 220.

In one implementation, subsequent to the switchover or failover exchanging the active and standby roles between the virtualized production server 220 and the virtualized replica server 260, switchback or failback may be performed to return the active role to the virtualized production server 220 and the standby role to the virtualized replica server 260. In one implementation, performing the switchback or failback may include determining whether to overwrite the data that existed on the virtualized production server 220 prior to the switchover or failover with the data existing on the virtualized replica server 260 at the time that the switchback or failback has been initiated. Furthermore, in response to an event that causes data loss on the virtualized production server 220, the lost data can be restored from the virtualized replica server 260 via reverse synchronization to the virtualized production server 220, or the lost data may be recovered from a certain event or point in time via the data rewind capabilities, which may involve locating a suitable event-stamped or time-stamped checkpoint and/or bookmark to roll lost or corrupted data on the virtualized production server 220 back to the event or point in time prior to when the data was lost or corrupted. In one implementation, further detail relating to techniques that may be used to handle replication, switchover or failover, switchback or failback, and the data rewind capabilities in the system 200B may be described in "CA ARCserve Replication and High Availability for Virtualized Server Environments Operating Guide for Windows r16—Protecting Hyper-V Environments," the contents of which are hereby incorporated by reference in their entirety.

Figure 3:
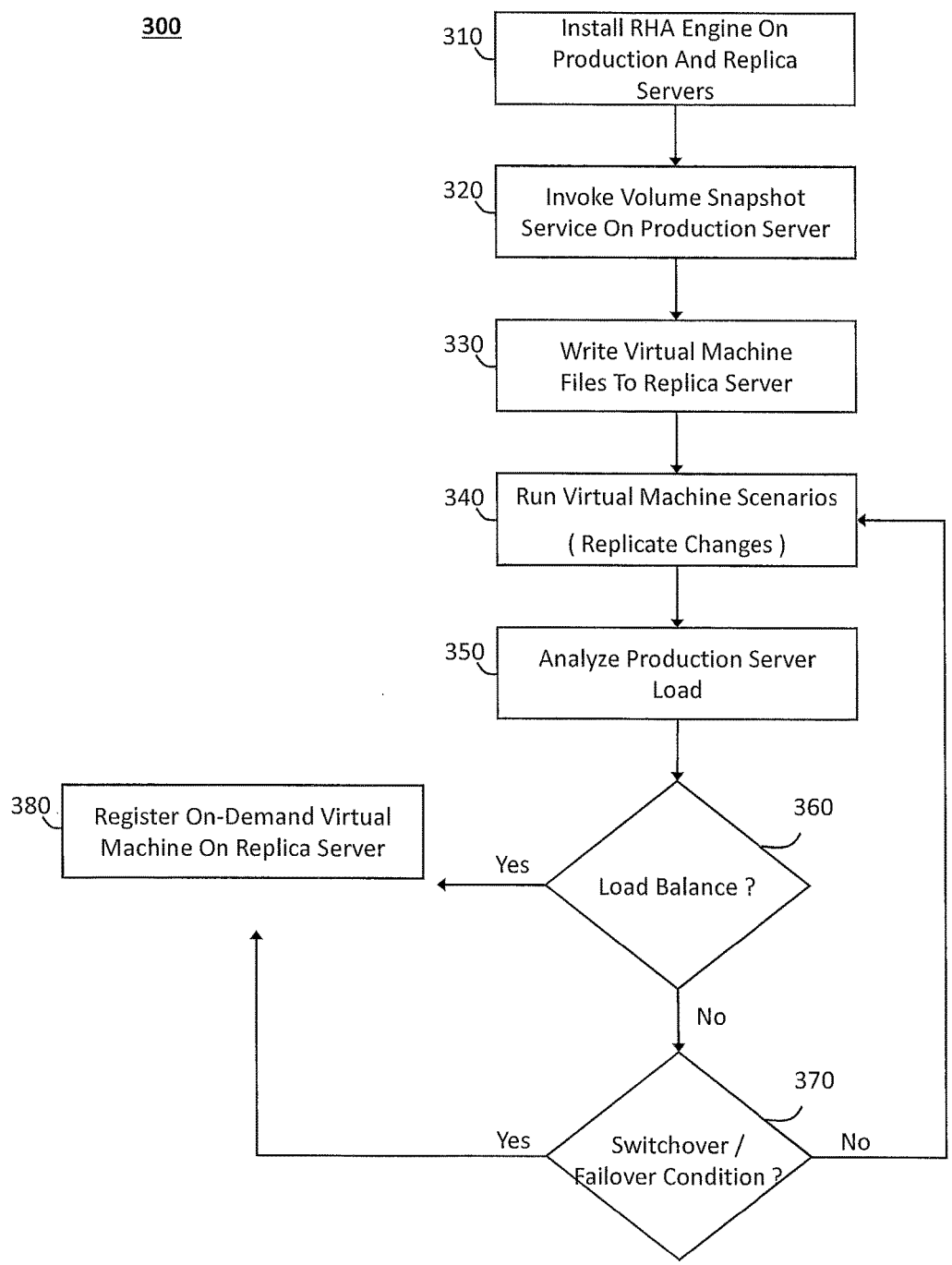
FIG. 3 illustrates an exemplary method that may be used to balance loads and manage switchover or failover conditions in a virtualized replication and high availability environment, according to one aspect of the invention.

According to one aspect of the invention, FIG. 3 illustrates an exemplary method 300 that may be used to balance loads and manage switchover or failover conditions in a virtualized replication and high availability environment. In particular, the method 300 may include an initial operation 310 to install a replication and high availability engine in a parent partition on a virtualized production server (rather than individual virtual machines running in child partitions on the virtualized production server) and a similar replication and high availability engine in a parent partition on a virtualized replica server. In addition, operation 310 may include installing various virtualization stack components in guest operating systems associated with the virtual machines running on the virtualized production server to enable the replication and high availability engine to determine host names associated therewith. In one implementation, the replication and high availability engine may then automatically discover all the virtual machines on the virtualized production server in an operation 320, which may further include a volume shadow copy service (VSS) writer associated with the virtualization stack collecting all the files relating to the discovered virtual machines (e.g., *.vhd files that represent virtual hard disks associated with each virtual machine, *.xml configuration files that contain unique identifiers and various settings associated with each virtual machine, and *.avhd files that contain all snapshots associated with the individual virtual machines).

In one implementation, in response to suitably collecting all the files relating to the discovered virtual machines, the replication and high availability engine may automatically create various replication scenarios associated with each virtual machine in an operation 330. In particular, the replication scenarios may generally define various replication properties associated with each virtual machine (e.g., whether to enable or disable scheduled bookmarks, establishing spool sizes and directory paths, whether to replicate in online or scheduled modes, etc.). In one implementation, each replication scenario associated with an individual virtual machine may include all the files relating thereto, including the *.vhd, virtual hard disk file, the *.xml configuration file, and the *.avhd snapshot file associated with the individual virtual machine, which may be written to the virtualized replica server. In one implementation, the replication and high availability engine may then run all the scenarios associated with all the virtual machines in an operation 340 to replicate and protect all the virtual machines. Alternatively, operation 340 may include selecting certain virtual machines (or certain scenarios associated with a particular virtual machine) to customize the replication scenarios used to protect the virtualized production server in operation 340. In one implementation, in response to initially synchronizing the files associated with the virtual machines to the virtualized replica server in operation 330, the replication and high availability engine may then replicate any subsequent changes to the files associated with such virtual machines to the virtualized replica server in operation 340 (i.e., via a replication and high availability engine installed thereon).

In one implementation, a load associated with the virtualized production server may then be analyzed in an operation 350 to determine whether or not to initiate a procedure to balance the load associated with the virtualized production server. For example, an operation 360 may determine whether the virtualized production server currently has an overloaded status or could otherwise benefit from offloading one or more workloads to a standby or other alternate server. As such, in response to operation 360 triggering a load balance condition associated with the virtualized production server, an operation 380 may register one or more on-demand virtual machines to offload and redirect certain workloads from the virtualized production server, as will be described in further detail below. Otherwise, in response to operation 360 determining that the load associated with the virtualized production server does not reflect a need to balance the load, an operation 370 may determine whether or not a switchover or failover condition associated with the virtualized production server or the virtual machines running thereon has occurred. In one implementation, operation 370 may trigger the switchover or failover manually due to planned downtime, in response to a notification that the virtualized production server has become unavailable, or in other appropriate circumstances, or operation 370 may alternatively triggered the switchover or failover automatically (e.g., at a scheduled time, in response to detecting unavailability associated with the virtualized production server or certain virtual machines running thereon, etc.). For example, a replication and high availability engine on the virtualized replica server may periodically check the status associated with the virtualized production server in operation 370 to determine whether to trigger the switchover or failover procedure (e.g., sending ping requests to the virtual machines running on the virtualized production server to determine whether the virtualized production server responds to indicate availability, sending custom requests to specific applications, virtual machines, databases, or services running in the parent partition on the virtualized production server to verify the status associated therewith, etc.).

In one implementation, in response to operation 360 triggering a load balance associated with the virtualized production server or operation 370 detecting a switchover or failover condition, operation 380 may include the virtualized replica server creating and registering one or more on-demand virtual machines corresponding to any virtual machines on the virtualized production server that are associated with the load balance, switchover, failover condition. In particular, operation 380 may create the on-demand virtual machines from the virtual machine files corresponding to the virtual machines associated with the load balance, switchover, or failover condition and exchange active and standby roles between the virtualized production server and the virtualized replica server. As such, registering the on-demand virtual machines to perform the load balance, switchover, or failover condition may change the virtualized production server to a standby role and assign an active role to the virtualized replica server. Furthermore, in response to performing the load balance, switchover, or failover, the relevant replication scenarios may further specify how to handle reverse replication operations, which may be performed using a method having substantially similar characteristics to the method 300 shown in FIG. 3 and described in further detail herein (i.e., replicating changes to the on-demand virtual machines to protect or otherwise backup changes to the files associated therewith after the virtualized replica server became active). Accordingly, the replication and high availability engine on the virtualized replica engine may use the above-described techniques to continue replicating changes to the on-demand virtual machines in accordance with the reverse replication operations specified in the relevant scenarios once the virtualized production server becomes available (e.g., to resynchronize changes from the virtualized replica server to the virtualized production server, data on the virtualized production server may be compared to data on the virtualized replica server to determine the changes that need to be replicated back to the virtualized production server).

In one implementation, subsequent to the load balance, switchover, or failover performed in operation 380 to exchange the active and standby roles between the virtualized production server and the virtualized replica server, switchback or failback may be performed in a similar manner to return the active role to the virtualized production server and the standby role to the virtualized replica server. For example, in one implementation, performing the switchback or failback may include determining whether to overwrite the data that existed on the virtualized production server prior to the load balance, switchover, or failover with the data existing on the virtualized replica server at the time that the switchback or failback has been scheduled to occur. Furthermore, in response to an event that causes data loss on the virtualized production server, the lost data can be restored from the virtualized replica server via reverse synchronization to the virtualized production server, or the lost data may be recovered from a certain event or point in time via data rewind capabilities, which may involve locating a suitable event-stamped or time-stamped checkpoint and/or bookmark to roll the virtualized production server back to the event or point in time prior to when the data loss or corruption occurred on the virtualized production server.

In an embodiment, there is provided a system for providing a virtualized replication and high availability environment, wherein the system comprises: a production server having hardware to host a virtualization architecture, wherein the virtualization architecture includes a parent partition that contains a virtualization stack having access to the hardware associated with the production server and one or more child partitions configured to execute one or more virtual machines; a replica server having hardware to host the virtualization architecture; and a replication and high availability engine installed in the parent partition associated with the production server, wherein the replication and high availability engine is configured to: synchronize virtual machine files associated with the one or more virtual machines executed in the one or more child partitions to the replica server; and run one or more replication scenarios to replicate changes to the virtual machine files associated with the one or more virtual machines to the replica server.

In an embodiment, the replication and high availability engine is further configured to invoke a volume shadow copy service writer associated with the virtualization stack to capture the virtual machine files synchronized to the replica server. In an embodiment, the virtual machine files associated with the one or more virtual machines include virtual hard disk files having a *.vhd file format, configuration files having a *.xml file format, and snapshot files having a *.avhd file format. In an embodiment, the virtualization architecture further includes a hypervisor configured to isolate the parent partition from the one or more child partitions. In an embodiment, the virtualization stack includes one or more components configured to manage inter-partition communication between the parent partition and the one or more child partitions. In an embodiment, the virtualization architecture hosted on the replica server includes a parent partition configured to: create one or more on-demand virtual machines from the synchronized virtual machine files associated with the one or more replication scenarios; start the one or more on-demand virtual machines in one or more child partitions; and redirect end users and workloads from the one or more virtual machines executed in the one or more child partitions on the production server to the one or more on-demand virtual machines started in the one or more child partitions on the replica server. In an embodiment, the parent partition is configured to automatically redirect the end users and the workloads to the one or more on-demand virtual machines on the replica server in response to a switchover event that relates to planned downtime associated with the production server or the virtual machines executed thereon. In an embodiment, the parent partition is configured to automatically redirect the end users and the workloads to the one or more on-demand virtual machines on the replica server in response to a failover event that relates to unplanned downtime associated with the production server or the virtual machines executed thereon. In an embodiment, the parent partition is configured to automatically redirect the end users and the workloads to the one or more on-demand virtual machines on the replica server to a balance a load associated with the production server. In an embodiment, the parent partition is configured to redirect the end users and the workloads to the one or more on-demand virtual machines on the replica server to test the one or more on-demand virtual machines on the replica server without disrupting the one or more virtual machines executing on the production server. In an embodiment, the replica server is further configured to run the one or more replication scenarios in reverse to synchronize virtual machine files associated with the one or more on-demand virtual machines or changes to the virtual machine files associated with the one or more on-demand virtual machines to the production server. In an embodiment, the replication and high availability engine is further is configured to redirect the end users and the workloads from the one or more on-demand virtual machines on the replica server to the one or more virtual machines in the one or more child partitions on the production server in response to the replica server having run the one or more replication scenarios in reverse to perform switchback or failback from the replica server to the production server.

In an embodiment, there is provided a method for providing a virtualized replication and high availability environment, comprising: hosting a virtualization architecture on a production server, wherein the virtualization architecture includes a parent partition that contains a virtualization stack having access to hardware associated with the production server and one or more child partitions configured to execute one or more virtual machines; synchronizing, via a replication and high availability engine installed in the parent partition associated with the production server, virtual machine files associated with the one or more virtual machines executed in the one or more child partitions to a replica server; and running, via the replication and high availability engine, one or more replication scenarios to replicate changes to the virtual machine files associated with the one or more virtual machines to the replica server.

In an embodiment, the method further comprises invoking, via the replication and high availability engine, a volume shadow copy service writer associated with the virtualization stack to capture the virtual machine files synchronized to the replica server. In an embodiment, the virtual machine files associated with the one or more virtual machines include virtual hard disk files having a *.vhd file format, configuration files having a *.xml file format, and snapshot files having a *.avhd file format. In an embodiment, the virtualization architecture further includes a hypervisor configured to isolate the parent partition from the one or more child partitions. In an embodiment, the virtualization stack includes one or more components configured to manage inter-partition communication between the parent partition and the one or more child partitions. In an embodiment, the method further comprises: creating, via the virtualization architecture hosted in a parent partition on the replica server, one or more on-demand virtual machines from the synchronized virtual machine files associated with the one or more replication scenarios; starting, via the virtualization architecture hosted in a parent partition on the replica server, the one or more on-demand virtual machines in one or more child partitions; and redirecting end users and workloads from the one or more virtual machines executed in the one or more child partitions on the production server to the one or more on-demand virtual machines started in the one or more child partitions on the replica server. In an embodiment, the replica server automatically redirects the end users and the workloads to the one or more on-demand virtual machines on the replica server in response to a switchover event that relates to planned downtime associated with the production server or the virtual machines executed thereon. In an embodiment, the replica server automatically redirects the end users and the workloads to the one or more on-demand virtual machines on the replica server in response to a failover event that relates to unplanned downtime associated with the production server or the virtual machines executed thereon. In an embodiment, the replica server automatically redirects the end users and the workloads to the one or more on-demand virtual machines on the replica server to a balance a load associated with the production server. In an embodiment, the replica server automatically redirects the end users and the workloads to the one or more on-demand virtual machines on the replica server to test the one or more on-demand virtual machines on the replica server without disrupting the one or more virtual machines executing on the production server. In an embodiment, the method further comprises running the one or more replication scenarios on the replica server in reverse to synchronize virtual machine files associated with the one or more on-demand virtual machines or changes to the virtual machine files associated with the one or more on-demand virtual machines to the production server. In an embodiment, the method further comprises redirecting the end users and the workloads from the one or more on-demand virtual machines on the replica server to the one or more virtual machines in the one or more child partitions on the production server in response to the replica server having run the one or more replication scenarios in reverse to perform switchback or failback from the replica server to the production server.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system to provide a virtualized replication and availability environment, the system comprising:
   a production server having hardware and configured to host at least a first part of a virtualization architecture, wherein:
      the virtualization architecture comprises a parent partition that contains a virtualization stack having access to the hardware associated with the production server and one or more child partitions configured to execute one or more virtual machines, and
      the one or more virtual machines include respective operating systems having respective file systems with virtual machine files accessed by respective applications configured to be executed in the respective operating systems;
   a replica server having hardware and configured to host at least a second part of the virtualization architecture; and
   a replication and availability engine installed in the production server, and external to the one or more virtual machines, wherein the replication and availability engine is configured to:
   initially synchronize and then continuously or periodically replicate, while the one or more virtual machines execute on the production server, the virtual machine files associated with the one or more virtual machines executed in the one or more child partitions of the production server to the replica server by forming or updating replicated instances of the virtual machine files in association with data defining one or more replica virtual machines of the replica server, the one or more replica virtual machines having instances of the respective applications and being configured to execute a workload of the production server in place of the production server, wherein the replication and availability engine is configured to perform replication while the one or more replica virtual machines are not executing, wherein:
      the second part of the virtualization architecture is configured to cause end users or workloads to be automatically redirected from the one or more virtual machines executed in the one or more child partitions on the production server to one or more on-demand virtual machines that are associated with corresponding replicated instances of virtual machine files and that are started in the one or more child partitions on the replica server, and
      the second part of the virtualization architecture further includes a hypervisor configured to isolate the parent partition on the replica server from the one or more child partitions on the replica server.

2. The system recited in claim 1, wherein the replication and availability engine is further configured to invoke a volume shadow copy service writer associated with the virtualization stack to capture the virtual machine files synchronized to the replica server.

3. The system recited in claim 1, wherein the virtual machine files associated with the one or more virtual machines comprise virtual hard disk files having a *.vhd file format, configuration files having a *.xml file format, and snapshot files having a *.avhd file format.

4. The system recited in claim 1, wherein the parent partition on the replica server is configured to:
create one or more on-demand virtual machines from the synchronized virtual machine files; and
start the one or more on-demand virtual machines in one or more child partitions.

5. The system recited in claim 4, wherein the parent partition is configured to redirect the end users and the workloads to the one or more on-demand virtual machines on the replica server to test the one or more on-demand virtual machines on the replica server without disrupting the one or more virtual machines executing on the production server.

6. The system recited in claim 4, wherein the replica server is further configured to synchronize or replicate the virtual machine files from the replica server back to the production server.

7. The system of claim 1, wherein the replication and availability engine is configured to:
execute steps for automatically creating replication scenarios.

8. The system of claim 1, wherein the replica server comprises another instance of the replication and availability engine configured to:
cause changes to replicated instances of the virtual machine files made by the replica virtual machines to be synchronized with and replicated to data defining other replica virtual machines of another replica server.

9. The system of claim 1, wherein the replication and availability engine or another replication and availability engine is configured to:
cause at least some of the one or more replica virtual machines to start in response to a disruption associated with the production server or one or more applications executing thereon.

10. The system of claim 1, wherein the replication and availability engine in the production server or another instance of the replication and availability engine in the replica server is configured to cause the replica virtual machines to be registered to receive workload of corresponding ones of the one or more virtual machines in the production server in place of the corresponding ones of the one or more virtual machines in the production server upon a switchover or a failover condition.

11. The system of claim 1, wherein another replication and availability engine of the replica server is configured to start, after synchronizing and replicating, and in response to a switchover event or failover event, one or more on-demand virtual machines from the data defining one or more replica virtual machines on the replica server.

12. The system of claim 1, wherein:
the replication and availability engine is configured to periodically replicate the virtual machine files by:
reading data directly from volumes associated with the one or more virtual machines to obtain files relating to the operating systems, system state, and disk layout associated with the applications;
serializing the read data; and
sending the serialized data to another replication and availability engine installed on the replica server;
the one or more replica virtual machines are cold-site virtual machines during replication; and
the other replication and availability engine installed on the replica server is configured to inject the serialized and sent data into virtual hard disk files of the replica virtual machines that represent the volumes associated with the applications.

13. The system of claim 12, wherein the replica server is configured to respond to a switchover event or a failover event, after synchronizing and after or while replicating, by creating the replica virtual machines by:
configuring one or more of the replica virtual machines with various values specified in a virtual machine configuration file;
connecting the one or more of the replica virtual machines to respective disk images mounted from respective virtual hard disk files; and
booting the one or more of the replica virtual machines.

14. The system of claim 1, wherein replication is specified at least in part by one or more replication records defining various replication properties associated with respective ones of the one or more virtual machines on the production server, wherein the properties comprise three or more of the following:
a property enabling or disabling scheduled bookmarks on the production server,
a property setting spool sizes;
a property setting directory paths;
a property specifying that replicating is to occur in online modes;
a property specifying that replicating is to occur in scheduled modes;
a property specifying whether to synchronize at a file-level;
a property specifying whether to synchronize at a block-level;
a property specifying whether to ignore certain files;
a property specifying whether to run a script; or
a property enabling or disabling data rewind capabilities.

15. The system of claim 1, wherein the system is configured to use reverse path lookups to maintain consistent mappings between virtual hard disk files hosted on the replica server and the file systems associated with the applications.

16. The system of claim 1, wherein the replica server is configured to periodically request a response from the production server and boot the replica virtual machines in response to a failure of the production server to respond to the request.

17. A method to provide a virtualized replication and availability environment, the method comprising:
hosting at least a first part of a virtualization architecture on a production server, wherein:
the virtualization architecture comprises a parent partition that contains a virtualization stack having access to hardware associated with the production server and one or more child partitions configured to execute one or more virtual machines, and
the one or more virtual machines include respective operating systems having respective file systems with virtual machine files accessed by respective applications configured to be executed in the respective operating systems;
hosting at least a second part of the virtualization architecture on a replica server;
initially synchronizing and then continuously or periodically replicating, via a replication and availability engine installed in the parent partition associated with the production server, virtual machine files associated with the one or more virtual machines executed in the one or more child partitions of the production server to the replica server by forming or updating replicated instances of the virtual machine files in association with data defining one or more replica virtual machines of the replica server, the one or more replica virtual machines having instances of the respective applications and being configured to execute a workload of the production server in place of the production server, wherein the one or more replica virtual machines are not executing during replication, wherein:

the second part of the virtualization architecture is configured to cause end users or workloads to be automatically redirected from the one or more virtual machines executed in the one or more child partitions on the production server to one or more on-demand virtual machines that are associated with corresponding replicated instances of virtual machine files and that are started in the one or more child partitions on the replica server, and the second part of the virtualization architecture further includes a hypervisor configured to isolate the parent partition on the replica server from the one or more child partitions on the replica server.

18. The method recited in claim 17, further comprising invoking, via the replication and availability engine, a volume shadow copy service writer associated with the virtualization stack to capture the virtual machine files synchronized to the replica server, wherein the virtual machine files associated with the one or more virtual machines comprise virtual hard disk files and configuration files.

19. The method recited in claim 17, further comprising:
creating, via at least part of the virtualization architecture hosted in the parent partition on the replica server, one or more on-demand virtual machines from the synchronized virtual machine files;
starting, via at least part of the virtualization architecture hosted in the parent partition on the replica server, the one or more on-demand virtual machines in one or more child partitions.

20. The method recited in claim 19, wherein the replica server automatically redirects the workloads to the one or more on-demand virtual machines on the replica server in response to a switchover event that relates to planned downtime associated with the production server or the virtual machines executed thereon or in response to a failover event that relates to unplanned downtime associated with the production server or the virtual machines executed thereon.

21. The method recited in claim 19, wherein the replica server automatically redirects the workloads to the one or more on-demand virtual machines on the replica server to a balance a load associated with the production server.

22. The method recited in claim 19, further comprising:
running the one or more replication scenarios on the replica server in reverse to synchronize virtual machine files associated with the one or more on-demand virtual machines or changes to the virtual machine files associated with the one or more on-demand virtual machines to the production server; and
redirecting the workloads from the one or more on-demand virtual machines on the replica server to the one or more virtual machines in the one or more child partitions on the production server in response to the replica server having run one or more replications in reverse to perform switchback or failback from the replica server to the production server.

23. The method of claim 17, wherein the replica server comprises another instance of the replication and availability engine configured to:
cause changes to replicated instances of the virtual machine files made by the replica virtual machines to be synchronized with and replicated to data defining other replica virtual machines of another replica server.

24. The method of claim 17, wherein the replication and availability engine or another replication and availability engine is configured to:
cause at least some of the one or more replica virtual machines to start in response to a disruption associated with the production server or one or more applications executing thereon.

25. The method of claim 17, wherein the replication and availability engine in the production server or another instance of the replication and availability engine in the replica server is configured to cause the replica virtual machines to be registered to receive workload of corresponding ones of the one or more virtual machines in the production server in place of the corresponding ones of the one or more virtual machines in the production server upon a switchover or a failover condition.

26. The method of claim 17, wherein another replication and availability engine of the replica server is configured to start, after synchronizing and replicating, and in response to a switchover event or failover event, one or more on-demand virtual machines from the data defining one or more replica virtual machines on the replica server.

27. The method of claim 17, wherein:
the replication and availability engine is configured to periodically replicate the virtual machine files by:
reading data directly from volumes associated with the one or more virtual machines to obtain files relating to the operating systems, system state, and disk layout associated with the applications;
serializing the read data; and
sending the serialized data to another replication and availability engine installed on the replica server;
the one or more replica virtual machines are cold-site virtual machines during replication; and
the other replication and availability engine installed on the replica server is configured to inject the serialized and sent data into virtual hard disk files of the replica virtual machines that represent the volumes associated with the applications.

28. The method of claim 27, wherein the replica server is configured to respond to a switchover event or a failover event, after synchronizing and after or while replicating, by creating the replica virtual machines by:
configuring one or more of the replica virtual machines with various values specified in a virtual machine configuration file;
connecting the one or more of the replica virtual machines to respective disk images mounted from respective virtual hard disk files; and
booting the one or more of the replica virtual machines.

29. The method of claim 17, wherein replication is specified at least in part by one or more replication records defining various replication properties associated with respective ones of the one or more virtual machines on the production server, wherein the properties comprise three or more of the following:
a property enabling or disabling scheduled bookmarks on the production server, a property setting spool sizes;

a property setting directory paths;

a property specifying that replicating is to occur in online modes;

a property specifying that replicating is to occur in scheduled modes;

a property specifying whether to synchronize at a file-level;

a property specifying whether to synchronize at a block-level;

a property specifying whether to ignore certain files;

a property specifying whether to run a script; or a property enabling or disabling data rewind capabilities.

30. The method of claim 17, wherein the system is configured to use reverse path lookups to maintain consistent mappings between virtual hard disk files hosted on the replica server and the file systems associated with the applications.

31. The method of claim 17, wherein the replica server is configured to periodically request a response from the production server and boot the replica virtual machines in response to a failure of the production server to respond to the request.

\* \* \* \* \*